H. C. BOSCHEN.
NEGOTIABLE INSTRUMENT.
APPLICATION FILED JUNE 3, 1920.

1,372,397.

Patented Mar. 22, 1921.

Inventor
*HERMAN C. BOSCHEN*

By *George A. Prevost*
Attorney

UNITED STATES PATENT OFFICE.

HERMAN C. BOSCHEN, OF RICHMOND, VIRGINIA.

NEGOTIABLE INSTRUMENT.

1,372,397.	Specification of Letters Patent.	Patented Mar. 22, 1921.

Application filed June 3, 1920. Serial No. 386,349.

*To all whom it may concern:*

Be it known that I, HERMAN C. BOSCHEN, a citizen of the United States, residing at Richmond, in the county of Henrico and State of Virginia, have invented certain new and useful Improvements in Negotiable Instruments; and I do hereby declare the following to be a full, clear, and exact description of the invention, such as will enable others skilled in the art to which it appertains to make and use the same.

This invention relates to improvements in negotiable instruments and more particularly to checks.

The principal object of the invention is to provide a shopping check to be used as a medium of purchase when a direct cash consideration is not made, and it is to be employed in lieu of ordinary credit transactions.

With the novel check forming the subject matter of the present invention, a purchaser may buy an article from a dealer and give the merchant his shopper's check for the amount of the purchase. This check will be post-dated, for example, thirty days from the date of the transaction, and thus the buyer will obtain thirty days' credit without the merchant having to enter the transaction on his books or send a bill to the customer.

The invention is more specifically set forth in the following detailed description, which should be read in connection with the accompanying drawing.

The drawing shows a front view of the preferred form of the check.

In the drawing, 1 represents a check blank, which is provided on the front face with a delineated number space 2; a delineated post-dating space 3; a designated space 4 to receive the numerical amount for which the check is drawn; a designated space 5 to permit filling in the name of the bank in which the purchaser deposits or is to deposit his funds; printed matter 6 authorizing or ordering the bank to pay the amount set forth in the check; a delineated space 7 to receive the written or printed name of the dealer to whom the amount of the check is to be paid; a designated space 8 to receive the written amount for which the check is drawn; printed matter 9 ordering the bank to charge the amount of the check against the account of the maker; a space 10 to receive the maker's signature; a designated space 11 for the maker's address; printed matter 12 indicating that the check is a shopper's check, and a delineated space 13 to be filled in with the date of the purchase or transaction.

The ends of the check, as indicated at 14, are provided with a stiffening substance, corrugations, or other means to notify handlers of a large number of checks, that said check is not an ordinary check. The stiffening material or other indicating means will indicate to the touch of the handler, that said check is a shopper's check and must be set aside until the post-date arrives before it can be cashed. Thus the cashier or other person handling a great number of checks will be enabled to segregate the shopper's checks without examining each check with his eyes.

Instead of leaving the space 5 blank, a merchant may have a number of checks prepared with the names of the various banks in his city printed in this space, so that he may furnish the purchaser with a check on the particular institution in which the purchaser banks.

The merchant may also have his name printed in the space 7 to relieve the purchaser of writing in the name of the payee and in such case the printed matter 15 would, of course, be deleted.

In the use of the novel check, a purchaser selects the goods he desires to buy and if he does not wish to pay cash for the same, he uses a shopper's check, and post-dates the same for the time when the merchant is to receive cash for the check.

It is believed that the present check will educate the public to save and open bank accounts and will be a means of increasing the business of merchants and banks.

The customer may use the check in lieu of an open account and secure credit while at the same time closing the transaction with the merchant.

The shopper's check will also teach the public to avoid buying on credit, and will save the expense of charge records. The use of shopper's checks will enable the purchaser to readily secure a short term of credit, and cause him to open a bank account. The invention will permit a transaction to be closed at the time of purchase and eliminate the necessity of sending checks to pay bills. It will also enable the purchaser to keep a complete record of expenditures at all times and it will educate the public to save.

The invention will benefit the merchant as follows: (1) Immediate financial protection. (2) Saving in stamps, stationery, book keeping, etc. (3) A close knowledge of his customer. (4) Materially decrease the overhead expenses connected with a business.

What I claim and desire to secure by Letters Patent is:—

1. A check blank especially adapted for shopping purposes, the check when made out, to be paid on a date subsequent to that of the transaction in which it is used, said blank having a designated post date space for filling in a future date upon which the check is to be paid by a bank or depository upon which it is drawn, matter on said blank directing a particular bank or depository to pay the amount of the check, delineated spaces adapted to be filled in with the amount for which the check is drawn, and a signature space to receive the signature of the maker.

2. A check blank especially adapted for shopping purposes, the check when made out, to be paid on a date subsequent to that of the transaction in which it is used, said blank having a designated post date space for filling in a future date upon which the check is to be paid by a bank or depository upon which it is drawn, matter on said blank directing a particular bank or depository to pay the amount of the check, delineated spaces adapted to be filled in with the amount for which the check is drawn, a signature space to receive the signature of the maker, and a designated space for filling in the date of the shopping transaction.

3. A check blank especially adapted for shopping purposes, the check when made out, to be paid on a date subsequent to that of the transaction in which it is used, said blank having a delineated post date space for filling in a future date upon which the check is to be paid by a bank or depository upon which it may be drawn and a signature space, and being provided with means, perceptible to the touch of a handler, differentiating the said check from ordinary commercial paper.

In testimony whereof I affix my signature.

HERMAN C. BOSCHEN.